United States Patent
Kadashevich (10) Patent No.: US 8,006,234 B2
(45) Date of Patent: *Aug. 23, 2011

(54) METHOD AND SYSTEM FOR IDENTIFYING RUNAWAY SOFTWARE AGENTS

(75) Inventor: Julie A. Kadashevich, Tyngsboro, MA (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

This patent is subject to a terminal disclaimer.

(21) Appl. No.: 11/832,500

(22) Filed: Aug. 1, 2007

(65) Prior Publication Data

US 2007/0271546 A1      Nov. 22, 2007

Related U.S. Application Data

(63) Continuation of application No. 10/761,919, filed on Jan. 20, 2004, now Pat. No. 7,269,758.

(51) Int. Cl.
  G06F 9/44     (2006.01)
  G06F 11/00    (2006.01)

(52) U.S. Cl. ........ 717/127; 717/120; 717/124; 717/126; 717/131; 714/25; 714/34; 714/38; 714/48; 714/55

(58) Field of Classification Search .................. 717/127; 714/55

See application file for complete search history.

(56) References Cited

U.S. PATENT DOCUMENTS 6,330,588 B1 * 12/2001 Freeman ................... 709/202
2006/0053350 A1 * 3/2006 Tsuyuno et al. ............. 714/55

FOREIGN PATENT DOCUMENTS

JP      56137451 A   * 10/1981
JP      60054054 A   *  3/1985

* cited by examiner

*Primary Examiner* — Thomas K Pham
(74) *Attorney, Agent, or Firm* — David A. Dagg (57) ABSTRACT

A method and system for identifying runaway software agents operating in a computer system is disclosed. An operating window is defined for an agent. The operating window specifies the maximum desired operating time for the agent. When an agent begins operation, its start time is recorded. At a later time, a measurement is made comparing the start time and current measurement time to the operating window. If the comparison indicates that the agent has exceeded the operating window, the agent is identified as a runaway agent. The computer system processes data associated with the runaway agent and displays it to a user interface such as a monitor.

23 Claims, 10 Drawing Sheets

METHOD AND SYSTEM FOR IDENTIFYING RUNAWAY SOFTWARE AGENTS

CROSS-REFERENCE TO RELATED APPLICATIONS

The present application is a Continuation application under 35 U.S.C. 120 of commonly owned prior application Ser. No. 10/761,919, filed Jan. 20, 2004 now U.S. Pat. No. 7,269,758 in the name of A. Julie Kadashevich, now allowed, entitled "Method and System for Identifying Runaway Software Agents".

BACKGROUND OF THE INVENTION

Management and workflow collaboration software systems are used by organizations to maintain the efficiency of workforces. Among other things, these systems, herein referred to as enterprise systems, allow employees to communicate, obtain information, requisition products and services, generate documents, and perform online training. Management systems may also connect portions of an organization that are separated geographically. As a result, management systems are often spread across multiple servers coupled to the network. The distributed nature of management systems along with the requirement that they perform numerous operations simultaneously makes them very large and complex.

Adding to the complexity of management systems is the fact that many of these systems have evolved over time. This evolution has largely been driven by customer needs and has resulted in rather basic management systems evolving into the large, complex ones predominant today. In addition, users must be able to write their own applications to extract maximum utility from management systems. The combination of old/new software executable instructions and customer developed software instructions may produce software environments that are difficult to troubleshoot. For example, an enterprise system may be executing hundreds or thousands of software agents as a matter of normal operation. A software agent as used herein refers to any self-contained potentially adaptive software application or an executable sequence of instructions, typically written by an end user. Software agents can be short lived, i.e. having lifetimes of less than a second, or can be long-lived having lifetimes measured in hours or days. Software agents may need to operate according to a schedule. And, if a particular agent is not operating at the appropriate time, it may be due to either a problem with the scheduled agent, a problem with one of the agents currently running, or a problem with processes that schedule agents. In addition, users can write agents that have infinite loops or run too long and consume too many resources. Typically, identifying the exact cause of late agents is problematic.

Systems and methods for monitoring agent activity may not easily identify problematic agents because there is no apriori mechanism for identifying when an agent may become problematic. Furthermore, existing tools may not isolate a particular, problematic agent.

There exists a need for systems and methods that identify and monitor agents that may become problematic before they actually cause a problem. In addition, there is a need for identifying and rank ordering agents that are causing problems so that system resources can be adaptively managed.

SUMMARY OF THE INVENTION

The system and method of the present invention monitors the operation of software agents operating in a computer system. An agent is identified and classified as a runaway agent if it operates outside a predefined time window having a duration associated therewith. Information about the runaway agent is reported to the system and/or a user interface for facilitating remediation of the problematic agent.

In accordance with a preferred embodiment, a method for identifying a software agent operating in a computer system includes defining a time window for the operating agent. Then, a current time signal is received. A start time for the agent is determined, where the start time indicates when the agent began operating within the system. The start time and current time are used to determine if the time window has been exceeded by the operating agent. If the agent has exceeded the time window it is flagged as a runaway agent.

In accordance with another aspect of the present invention, a method for managing a plurality of software agents operating in a computer system includes defining an operating window for the plurality of agents. The method further includes identifying the agents exceeding the operating window and producing a set of agents making up the identified set. The identified set is filtered according to filtering parameters before ordering the agents making up the identified set. The identified set is then displayed on a user interface to facilitate the management of the agents.

In accordance with yet another aspect of the present invention, a computer program product having machine-readable instructions provided thereon for instructing a processor to perform a method for identifying a software agent operating in a computer system includes instructions for defining a time window associated with the agent, instructions for receiving a current time signal, instructions for determining a start time for the agent, instructions for using the start time and the current time for determining if the time window has been exceeded and instructions for flagging the agent as a runaway agent if the time window is exceeded.

The foregoing and other features and advantages of the system and method for identifying and managing software agents will be apparent from the following more particular description of preferred embodiments of the system and method as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

While exemplary embodiments are provided, other embodiments are possible in light of the specification. Therefore, unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanges, and/or rearranged without departing from the disclosed systems and methods. Additionally, the shapes and sizes of components are also exemplary and unless otherwise specified, can be altered without affecting the disclosed systems and methods and without departing from the spirit and scope of the invention.

Management systems such as, for example, enterprise systems handle, without limitation, electronic mail (email) receipt and distribution, access and management to intranet and Internet web sites, management of internal databases, multimedia conferencing, and online calendaring and appointment management. In addition, enterprise systems handle many other functions necessary to assist large and small organizations in operating efficiently. Management enterprise systems rely heavily on the use of software agents for managing the workflow. Although agents can be generated by the enterprise system itself or by users, the agents are typically of two types, scheduled or event driven. Scheduled agents are those having a defined start time. In addition, scheduled agents may have a predetermined stop time or the stop time can be dictated by an event such as, for example, but not limited to, receipt of an interrupt or the start of another agent. In contrast, event driven agents begin upon the occurrence of a particular event rather than at a certain time. Examples of event driven agents are, but are not limited to, document creation agents, document closing agents, database opening agents, user logon processing agents, email agents activated upon receipt of a message, and web based agents. The most common class of web based event driven agents may be those associated with hyper text transport protocol (HTTP). An HTTP process has a plurality of threads associated therewith. In a preferred embodiment, the default number of multiple threads in an HTTP process is forty. Each thread has a unique identifier, for example an identification number, referred to as an HTTP thread ID. An HTTP environment can be multi-threaded with each HTTP thread running a single agent thus making it possible for a given agent to be running on multiple HTTP threads simultaneously. For example, in the preferred embodiment, forty copies of the same agent can be executed, or run, at the same time. An HTTP thread ID number is associated with the instance of an agent that is executing on the respective thread making it possible to identify which copy of an agent a given set of activities are associated with. For example, identifying instances of agents using HTTP thread ID's makes it possible to determine when a specific instance of an agent started and/or ended. In the above example, a reference to the instance of the agent, such as an agent ID, consists of the agent's name along with the HTTP thread ID associated with the agent. In addition, a database name or other parameter may be associated with the agent name and HTTP thread ID to further provide details about the agent and to uniquely identify the particular agent. As used herein, a thread is a program path of execution, and multi-threaded means that multiple lines of a single program can be executed simultaneously. When agents are running on multiple threads, the operating system may treat each thread as a separate and distinct process.

When numerous agents are running simultaneously, problems can occur when one or more agents fail to operate as intended. Problematic agents can be associated with the management enterprise system itself or of with user generated agents. Agents in the management system computing environment may become problematic when a new software release is implemented because of, without limitation, software, and the inability to identify a particular agent when attempting to diagnose system abnormalities, or incompatibilities with system interfaces or user generated agents. User generated agents may be problematic due to incompatibilities with operating system components, failure to understand the functionality of developed agents, security misconfigurations associated with developed agents, faulty parameters associated with developed agents, etc.

Agent failures can take many forms, however, certain failures tend to be more prevalent. Examples of common agent failures are, but are not limited to, mismanagement of system memory by agents, excessive central processing unit (CPU) usage, spawning of too many sub processes or threads, running longer than expected, failing to execute at the proper time, entering an infinite loop, and mis-applied/misused security settings. The present invention addresses agents that fail to execute at the proper time, herein referred to as late agents, and agents that run for too long of a time duration, herein referred to as runaway agents.

Figure 1:
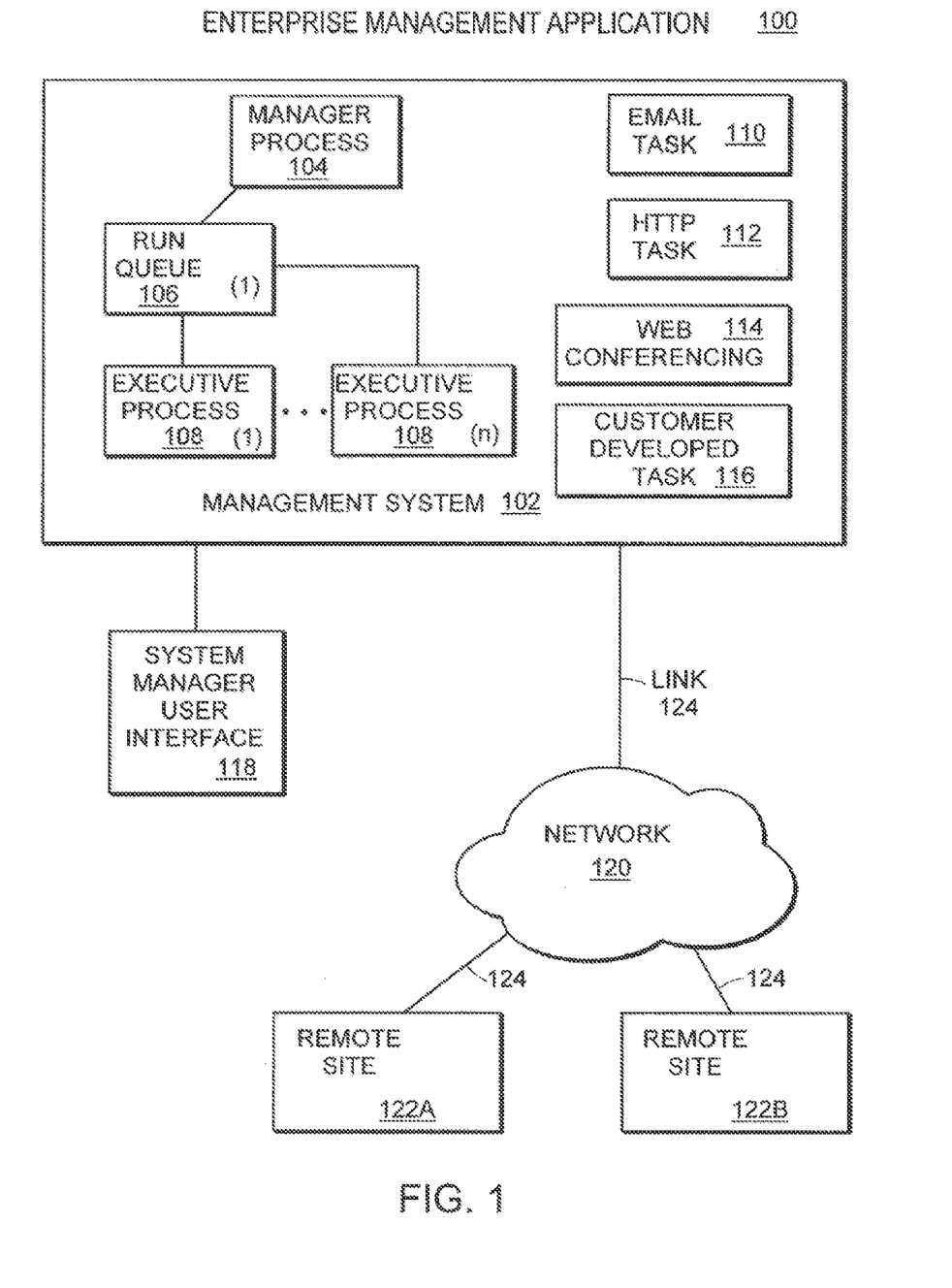
FIG. 1 illustrates an exemplary management system consistent with preferred embodiments of the present invention.

FIG. 1 illustrates an exemplary embodiment of a management system for example an enterprise management system, in accordance with the invention. The management application 100 includes management computing system 102 which includes a manager process 104, a run queue 106, an executive process 108, an email task 110, an HTTP task 112, a web conferencing task 114, a customer developed task 116, and a system manager user interface (UI) 118. The management application 100 also includes network 120, remote site 122A and 122B, and links 124. The management computing system 102 may be executing on one or more servers within a corporation, university, governmental agency, or the like. The manager process 104 oversees management of software agent activity within a management application 100. In particular, the manager process 104 operates in connection with a plurality of executive processes 108 and a run queue 106. When an agent is scheduled to run, the manager process 104 places it in run queue 106. When an executive process 108 is free, the manager process 104 instructs the executive process 108 to begin processing the scheduled agent. When the executive process 108 begins operating on an agent, the agent becomes a running agent for the duration of time it is associated with executive process 108. When an agent has finished executing, the executive process 108 releases the agent and becomes available for running a new agent.

The management computing system 102 may also include an email task 110. The email task 110 is responsible for handling all incoming and outgoing email. Agents associated with email task 110 may be scheduled agents or event driven agents. Examples of scheduled agents operating in conjunction with email task 110 may be an email checking agent. When launched, a router operating in the software delivers mail and sends an event to an agent manager indicating that new mail has been delivered to a database. If an active agent resides in that database, it is invoked.

The HTTP task 112 may run on management computing system 102. The HTTP task 112 is responsible for processing all HTTP related traffic within enterprise management application 100. The HTTP task 112 may start all threads upon its activation, or startup, in response to HTTP requests received from network 120. HTTP task 112 runs event driven agents and threads. The HTTP task 112 may further start a new agent on any running thread. In an embodiment of the present invention, a given agent can run on more than one thread. In such an embodiment, knowing only a problematic agent's name is not sufficient for identifying it. Information about the thread running the problematic agent is required to positively identify the agent.

The Web conferencing task 114 is responsible for handling all audio, video and text data associated with collaborative conferencing. The Web conferencing task 114 may interact with the email task 110 and/or the HTTP task 112 when providing web conferencing capabilities to an organization. As a result, the web conferencing task 114 may utilize scheduled and event driven agents.

The customer developed task 116 may include software developed by a user of the management application 100. User developed software may take many forms and may utilize one or more scheduled or event driven agents. An example of user developed task 116 may be an order processing agent. The order processing agent may have an event driven portion that executes when a user opens an online ordering capability. Once the order is entered, a scheduled agent may operate on a predetermined cycle seeking management approvals for the order before sending it to a vendor for fulfillment.

The system manager UI 118 may include a computer display for presenting information to a system administrator. For example, the manager process 104 may detect an improperly running agent and cause a popup window to appear on the system manager UI 118. After viewing the error report, the system administrator can take corrective action.

The network 120 connects management computing system 102 to remote sites 122A and 122B. In many large corporations, there may be a headquarters and a plurality of field offices. In FIG. 1, management computing system 102 may be located within the headquarters building while remote sites 122A and 122B are located in a different city, state or country. Network 120 can be any type of data network such as a local area network (LAN), a metropolitan area network (MAN), or a wide area network (WAN). Furthermore, network 120 may utilize any network protocol, or combination of protocols, such as frame relay, packet switched, Internet protocol (IP), synchronous optical network (Sonet), asynchronous transfer mode (ATM), and the like. Links 124 are used to convey data across network 120 and may be comprised of twisted pair cable, coaxial cable, optical fiber, free-space optical links, radio-frequency (RF) links, or the like.

Figure 2:
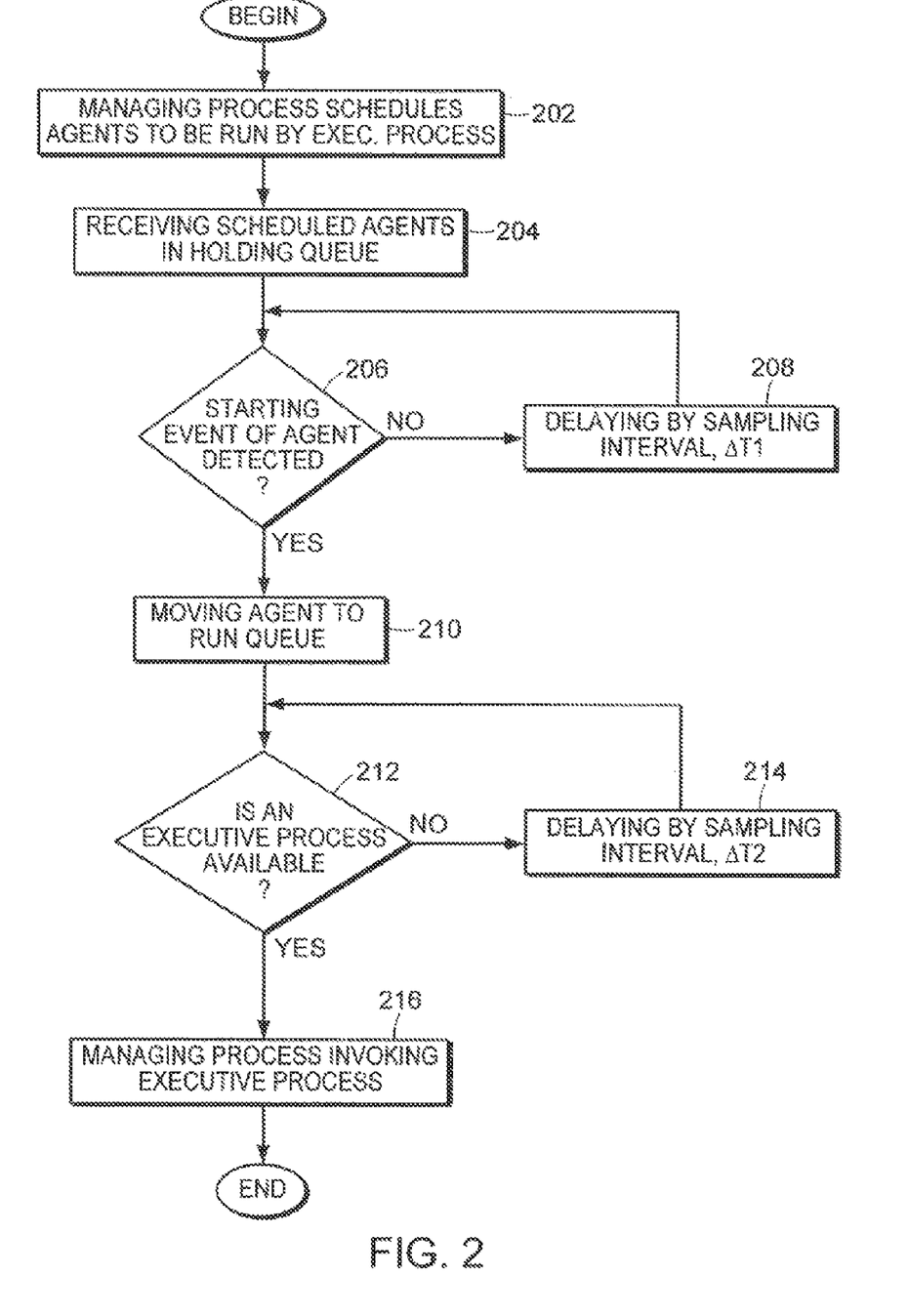
FIG. 2 illustrates a flow chart of an exemplary method for queuing agents in a management system in accordance with a preferred embodiment of the present invention.

FIG. 2 illustrates a flow chart of an exemplary method for queuing an agent. The method begins when managing process 104 schedules an agent to be run by executive process 108 per step 202. The scheduled agent is placed into a holding queue by manager process 104 per step 204. A check is made to determine if a start event, or time, associated with the scheduled agent has been detected per step 206. If a start event/time is detected, the scheduled agent is moved into run queue per step 210. If a start event/time is not detected, a programmable delay interval, $\Delta T1$, is executed before the data flow returns to the input of step 206 per step 208. The programmable delay interval of step 208 can be adjusted to any number by the system administrator. In some applications, the programmable delay interval may update the display on system manager UI 118; therefore, the delay interval will normally be several minutes. In a preferred embodiment of the invention, the default delay interval is 5 minutes.

After the scheduled agent is placed into the run queue, a check is made to determine if an executive process is available per step 212. In most embodiments of the invention, enterprise management application 100 will utilize a single manager process 104 and a plurality of executive processes 108. Each executive process 108 shares a single run queue 106. If an executive process is available, the manager process 104 invokes the appropriate executive process per step 216. In contrast, if executive process 108 is not available, flow is delayed by a programmable delay interval, $\Delta T2$, before returning to the input of step 212 per step 214.

When executive process 108 begins processing an agent, the agent is referred to as an active, or running, agent. While active, an agent is deemed to be alive. When the agent has finished executing, either normally or via manual termination, it is deemed to be dead. If the agent is later placed in the holding queue it is referred to as a scheduled agent until it is once again processed by an executive process 108.

Figure 3A:
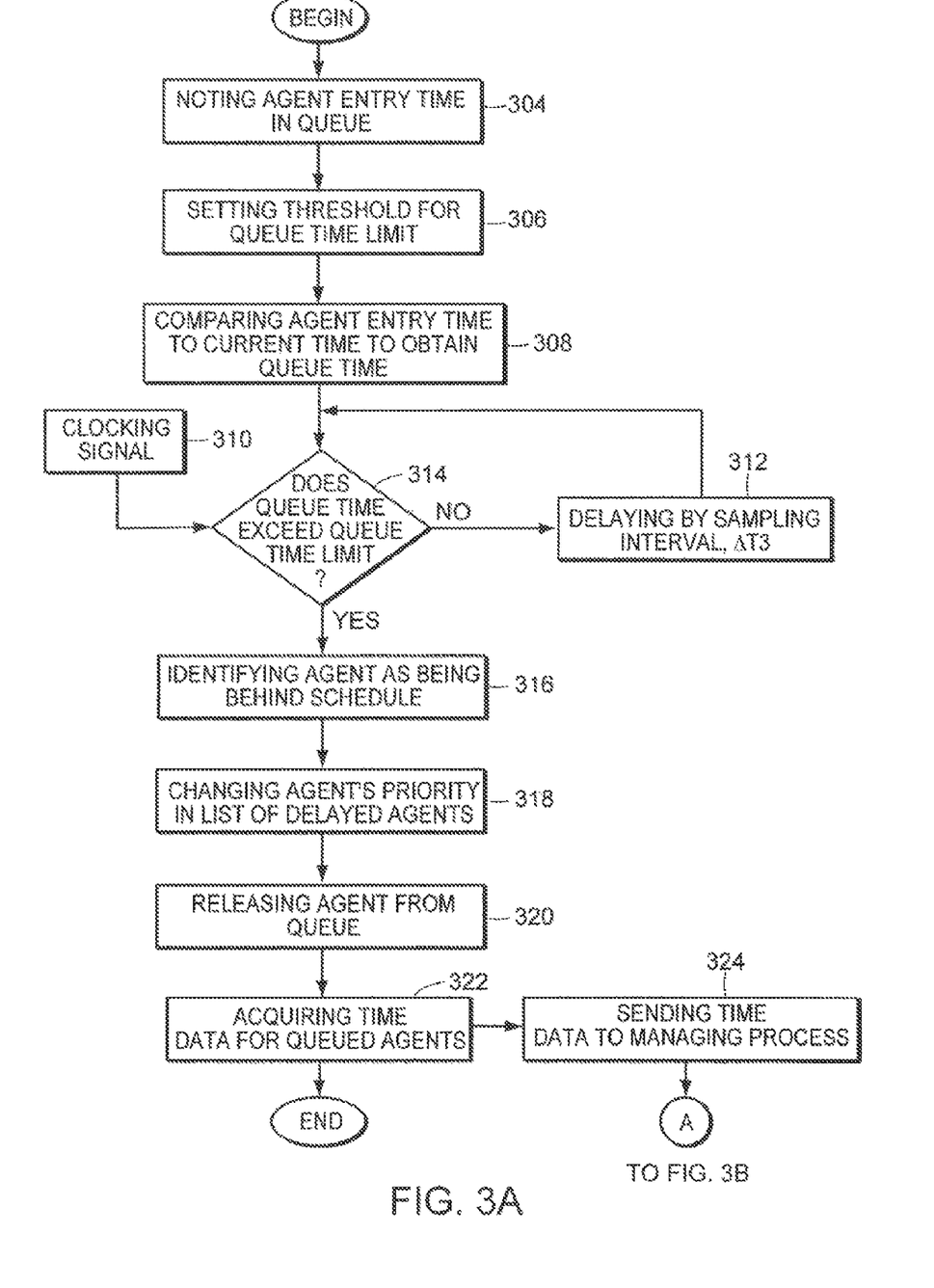
FIGS. 3A and 3B illustrate flow charts of an exemplary method for identifying and managing late agents in accordance with a preferred embodiment of the present invention.

FIG. 3A illustrates a flow chart of an exemplary method for identifying agents that are behind schedule. The method illustrated in FIG. 3A is a more detailed presentation of step 204 in FIG. 2. The agent's time of entry into the queue is stored in memory per step 304. A predetermined threshold for the queue limit is set by enterprise management system 100 or by a system administrator using system administrator UI 118 per step 306. A single threshold may be used, or alternatively, unique thresholds can be associated with each respective agent in the queue. The threshold determines a time limit beyond which an agent is considered to be late. The method illustrated in FIG. 3A then compares the entry time of the agent to the current time which is obtained from the clock operating in step 310 per step 308. The result of the comparison is the queue time for the agent. Next, the queue time is compared to the threshold of step 306 per step 314. If the queue time is greater than the prescribed threshold, the agent is flagged as being behind schedule per step 316. In contrast, if the queue time does not exceed the threshold, a programmable delay interval, $\Delta T3$, is imposed before making a subsequent queue time calculation per step 312.

If an agent is identified in step 316, the agent's priority in a list of delayed agents may be changed by the enterprise management system 100 or by a system administrator per step 318. Changing an agent's priority has the effect of making its execution a higher or lower priority depending on whether the agent's priority is changed, i.e. raised or lowered, respectively. Alternatively, the agent can be released from the queue by the management system 100 or the system administrator per step 320. After step 318 or 320, time data is acquired for the queued agents per step 322. Time data is sent to manager process 104 where it is used to rank order queued agents running behind schedule per step 324. Rank ordered data can be presented to a system administrator using system manager UI 118.

Since enterprise management systems 100 may be executing thousands of agents, reporting every late agent may overwhelm the system administrator. Therefore, in preferred embodiments of the invention, agent data may filtered to reduce the number of agents reported to the system, or system administrator, using predefined filtering criteria. For example, in an embodiment of the invention, predefined filtering criteria may allow only the top 100 late, or runaway, agents to be processed and displayed to a user. An agent is considered in the top 100 if it is one of the 100 most delayed agents in the system. In a preferred embodiment of the invention, criteria for determining delays can be computed as a straight time across all agents. However, in an alternative embodiment, delays may be computed as a function of an agent's anticipated queue time versus the actual queue time associated with the agent. For example, a first agent may have a goal of being in the queue for no more than 2 minutes and a second agent may have a goal of being in the queue no more than 10 minutes. If the first agent is late by one minute and the second agent is late by two minutes, then a straight time across all agents would make agent two appear as the most problematic agent. In contrast, if the delay time is computed as a function of the desired queue time, then agent one is late by 50% and agent two is late by 20%. Using delay as a function of the desired queue time causes the first agent to be most problematic.

Figure 3B:
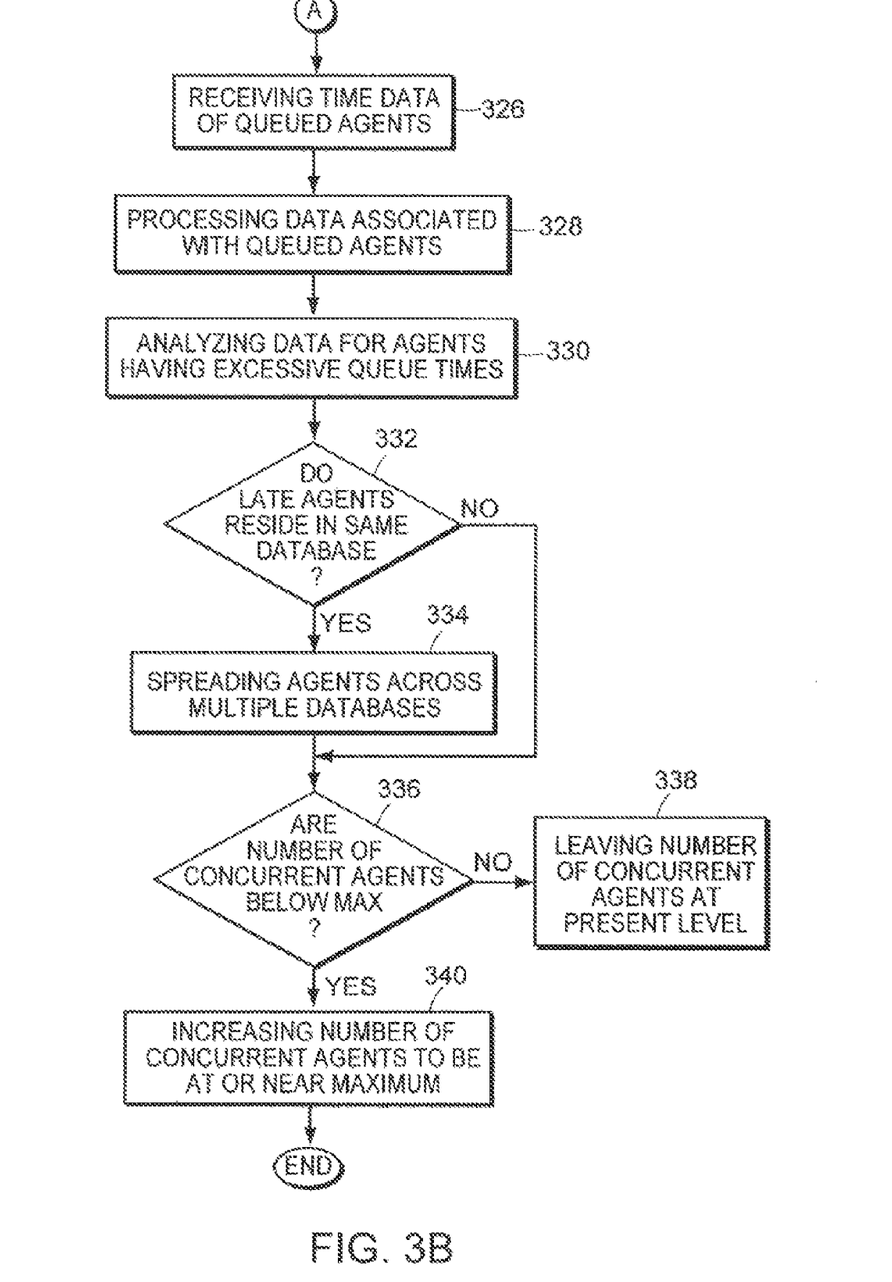

In FIG. 3B, time data is received by manager process 104 per step 326. Queued agent data is processed per step 328 and agents having excessive queue times are analyzed per step 330. A determination is made as to whether the problematic agents are resident in the same database per step 332. If the agents are resident in the same database, a recommendation is made to spread, or parse, the agents across two or more databases per step 334. If the agents are not from the same database in step 332, processing proceeds to the input of step 336. Then, returning to the output of step 334, a check is made as to whether the number of concurrent agents (i.e. number of agents allowed to run simultaneously) is below the maximum per step 336. If the number of concurrent agents is below the maximum, the number of concurrent agents can be increased per step 340. If the number of concurrent agents is at maximum, the number of concurrent agents may be left at its present level per step 338.

Figure 4:
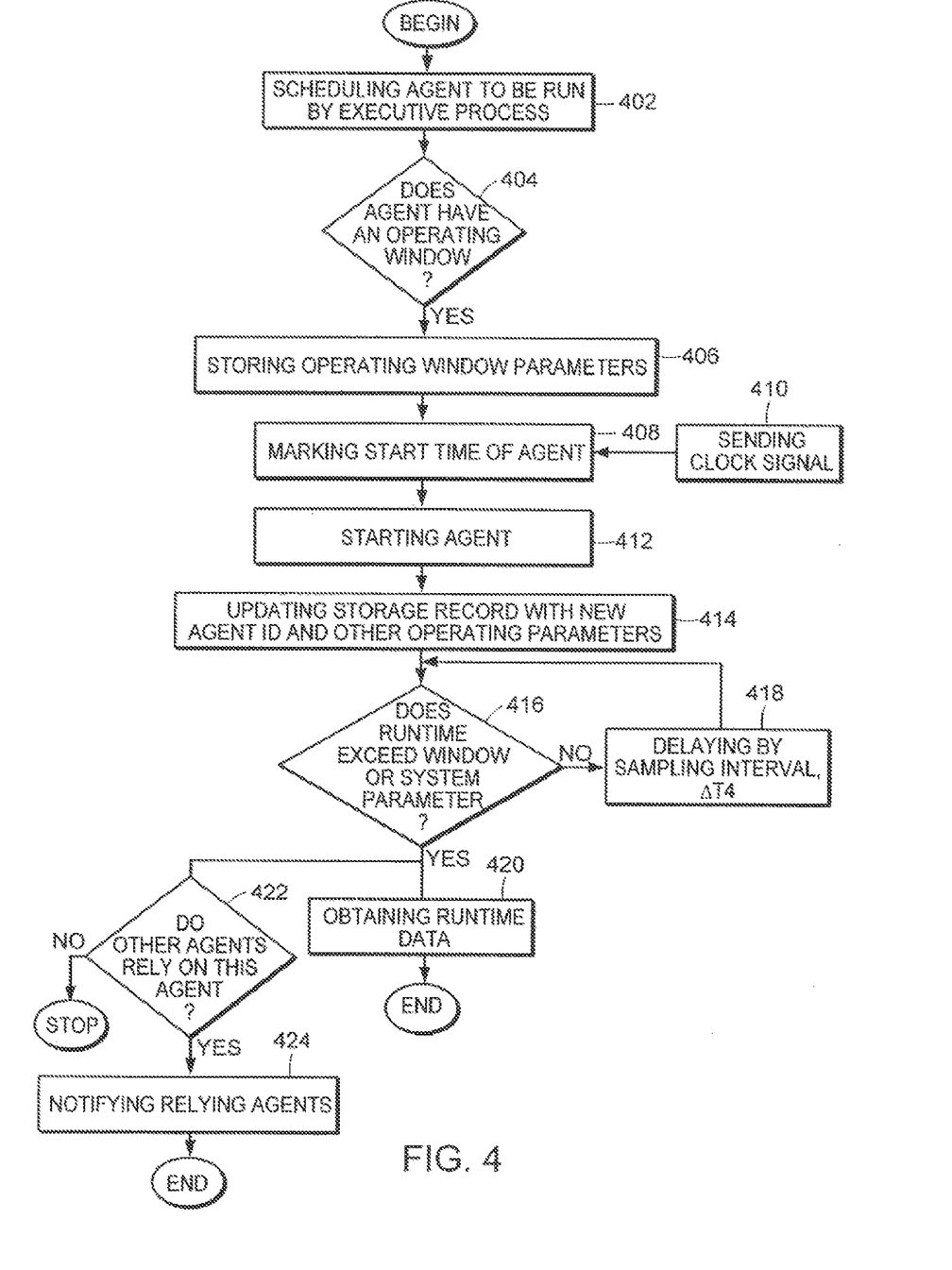
FIG. 4 illustrates a flow chart of a method for monitoring long running agents in an enterprise management system in accordance with a preferred embodiment of the present invention.

FIG. 4 illustrates a flow chart of an exemplary method for monitoring and reporting information associated with agents that have exceeded an allocated runtime. The method for monitoring and reporting runaway agents begins with scheduling an agent to be run by an executive process 108 per step 402. Next, the method determines if the scheduled agent has an operating window associated with it per step 404. An operating window may be a predetermined time that the agent is to run after being initiated. If an operating window is defined, the operating window parameters are stored per step 406. In contrast, if operating parameters are not defined the method goes to step 408. After step 406, the start time of the scheduled agent is marked per step 408. Step 408 receives a clock input from step 410 for use in associating an absolute system time with the scheduled agent in step 408.

Then the scheduled agent is started per step 412. When an agent begins execution, it is referred to as a running agent. The start of the agent does coincide with the start of a main thread associated with the agent. The ID of the running agent along with its operating parameters (start time, operating window, size, etc.) is stored in a data structure residing in computer memory per step 414. Next, a check is made to determine if the agent's running time exceeds its operating window or other time limit associated with a system parameter per step 416. If the agent has exceeded its allocated operating window, the agent's runtime data is obtained per step 420. After an agent is deemed to be running longer than its operating window, it is deemed to be a runaway agent. In step 416, if the agent has not exceeded its allocated operating window, a programmable delay interval $\Delta T4$ is imposed before making another check in step 416 per step 418.

The method flow may follow a second path after step 416 to step 422 in parallel to the main flow from step 416 to step 420. In the second path, a check is made to determine if other agents rely on the runaway agent per step 422. If other agents rely on the runaway agent, those relying agents are notified by the system per step 424. In an alternative embodiment of the invention (not shown in FIG. 4), system manager UI 118 can be notified in lieu of notifying relying agents or in addition to notifying relying agents.

The method described in FIG. 4 is exemplary and the recited steps may be executed in different orders. Furthermore, additional steps may be included to accommodate the needs of users of the system that the method is operating on.

Figure 5:
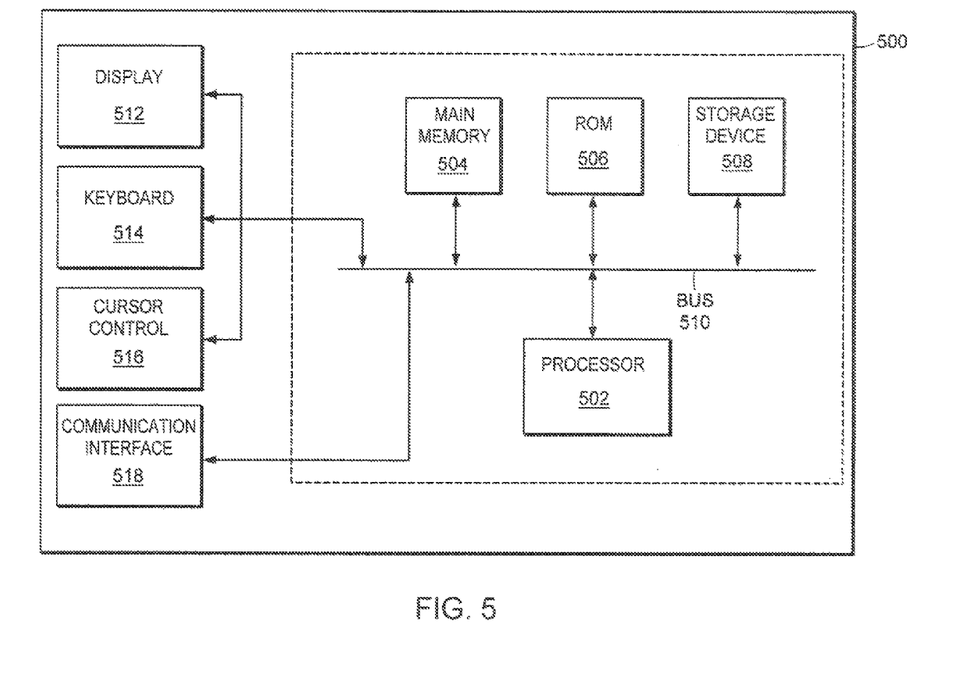
FIG. 5 illustrates an exemplary architecture of a general-purpose computer capable for implementing aspects of the invention in accordance with a preferred embodiment of the present invention.

FIG. 5 illustrates an exemplary general-purpose computer architecture useful for practicing embodiments of the invention. General-purpose computer 500 may be comprised of a processor 502, main memory 504, read only memory (ROM) 506, storage device 508, bus 510, display 512, keyboard 514, cursor control 516, and communication interface 518. Processor 502 may be any type of conventional processing device that interprets and executes instructions. Main memory 504 may be a random access memory (RAM) or a similar dynamic storage device. Main memory 504 stores information and instructions in machine-readable form for execution by processor 502. Main memory 504 may also be used for storing temporary variables or other intermediate information during execution of instructions by processor 502. ROM 506 stores static information and instructions for processor 502. It will be appreciated that ROM 506 may be replaced with other types of static storage devices such as programmable ROM, erasable programmable ROM, and the like. Data storage device 508 may include any type of magnetic or optical media and its corresponding interfaces and operational hardware. Data storage device 508 stores information and instructions for use by processor 502. Bus 510 includes a set of hardware lines (conductors, optical fibers, or the like) that allow for data transfer among the components of computer 500.

Display device 512 may be a cathode ray tube (CRT), liquid crystal display (LCD), or the like, for displaying to a user. Keyboard 514 and cursor control 516 allow the user to interact with computer 500. Cursor control 516 may be, for example, a mouse. In an alternative configuration, keyboard 514 and cursor control 516 can be replaced with a microphone and voice recognition means to enable the user to interact with computer 500.

Communication interface 518 enables computer 500 to communicate with other devices/systems via any communications medium. For example, communication interface 518 may be a modem, an Ethernet interface to an IP network, or a printer interface. Alternatively, communication interface 518 can be any other interface that enables communication between computer 500 and other devices or systems.

By way of example, a computer 500 consistent with the present invention provides a management computing system 102 with the ability to monitor scheduled and running agents on remote sites 122A and 122B via network 106. Computer 500 performs operations necessary to complete desired actions such as starting operating window parameters in response to processor 502 executing sequences of instructions contained in, for example, memory 504. Such instructions may be read into memory 504 from another computer-readable medium, such as a data storage device 508, or from another device (not shown) via communication interface 518. Alternatively, hard-wired circuitry may be used in place of or in combination with software instructions to implement the present invention. Thus, the present invention is not limited to any specific combination of hardware circuitry and software.

Figure 6:
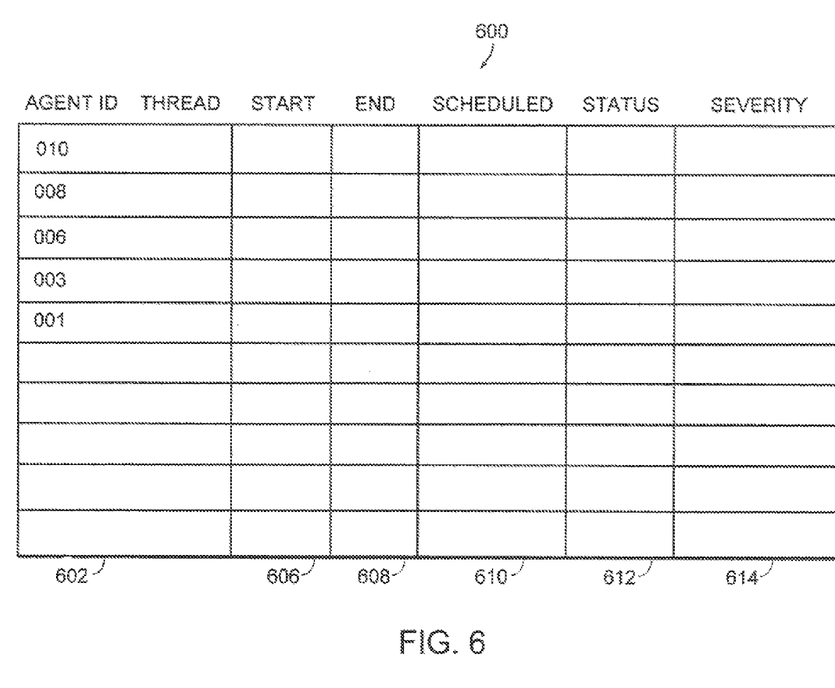
FIG. 6 illustrates an exemplary data structure representing agent data in a computer-readable memory in accordance with a preferred embodiment of the present invention.

FIG. 6 illustrates an exemplary computer-readable data structures, or records, useful for storing information associated with scheduled and running software agents. In FIG. 6, agent data structure 600 is comprised of an agent ID field 602, a start time field 606, an end time field 608, a scheduled field 610, a status field 612 and a severity field 614. Agent ID field may contain information useful for uniquely identifying agents. In an embodiment of the invention, agents may be identified using a unique number. Data presented in agent data structure 600 may be arranged using any of the fields; however, in most instances agents are ordered by agent number or by their adverse impact on the enterprise management application 100. For example, agent 010 of FIG. 6 may be the furthest behind schedule and agent 001 may be closest to its schedule.

Start time field 606 and end time field 608 may contain the start time and completion time for a given agent, respectively. Scheduled field 610 may contain information about the schedule of an agent. For example, scheduled field 610 may contain a flag where the value of the flag indicates whether the agent is in a queue awaiting execution or is currently being executed. Alternatively, scheduled field 610 may contain a numerical value indicating how far behind schedule a particular agent is operating.

Status field 612 may contain text fields indicating whether an agent is on schedule, behind schedule, operating within its allocated time window, or has exceeded its allotted time window. Alternatively, status field 612 may contain color codes such as red for an agent severely behind schedule, yellow for an agent that is falling progressively farther behind schedule and green for agents operating on schedule.

Severity field 614 may contain a text field providing an explanation of why an agent is behind schedule or operating outside its allocated time window. For example, severity field 614 may indicate to a system administrator that a particular agent is relying on an agent that is currently executing in an infinite loop and that the only way to get the relying agent on schedule is to manually terminate the agent stuck in the infinite loop.

Additional fields may be added to the data structure of FIG. 6 without departing from the spirit of the invention. In addition, the data structures associated with FIG. 6 may be distributed across multiple memory devices, geographic locations, etc. depending on particular implementations of enterprise management application 100.

Figure 7A:
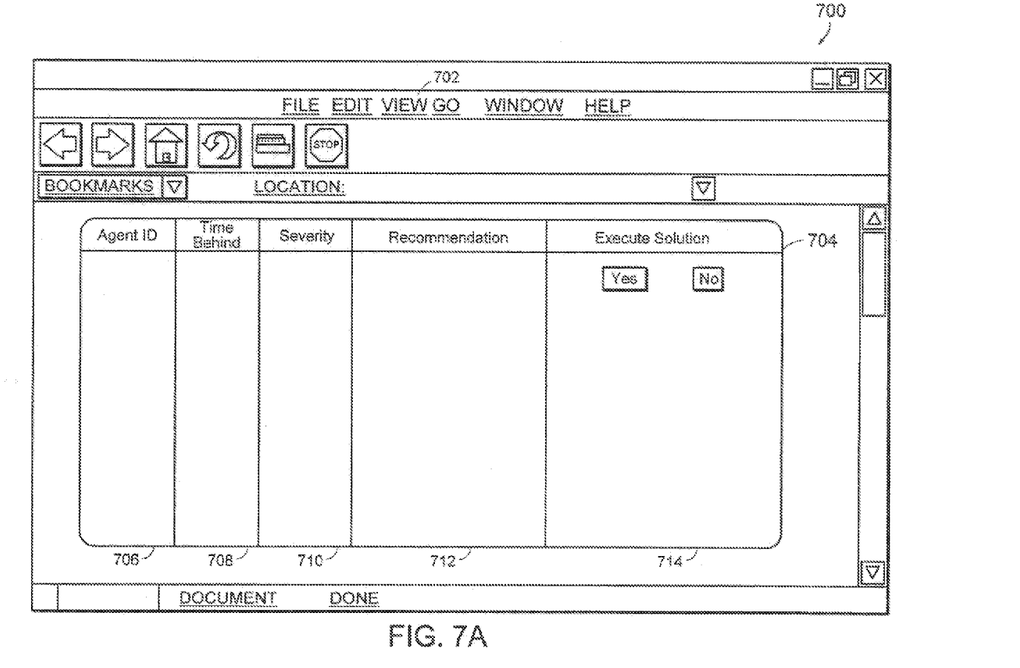
FIGS. 7A-7E illustrate exemplary user interfaces for providing agent data and thread data to a user in accordance with a preferred embodiment of the present invention.

FIG. 7A illustrates an exemplary user interface useful for providing information to a user. For example, Data display 700 may be provided to a system administrator using system manager UI 118. Data display 700 may comprise tool bar 702, reporting table 704, agent ID 706, time behind 708, severity 710, recommendation 712 and execute solution 714. Data display 700 may further be displayed on a cathode ray tube (CRT), flat panel display, or the like in a human-readable form, and the data can be displayed using a conventional browser such as Mozilla™ or Internet Explorer™.

Tool bar 702 may provide drop down menus for facilitating access to commonly used functions. For example, clicking on File using a pointing device, such as a computer mouse, may cause a drop down menu to appear. Choices in the drop down menu may allow a user to print the display, save the display to a file, open a new display window, etc.

Reporting table 704 may frame information displayed to a user in order to make displayed information easier to understand. Agent ID 706 may contain information identifying specific agents such as the agent ID field 702 values used in connection with FIG. 6. Agents reported on data display 700 may be ordered according to severity, agent ID, etc. Time behind 707 may contain information regarding the amount of time a particular agent is behind schedule. Severity 710 may indicate the impact a particular agent is having on enterprise management application 100. Recommendation 712 may contain a text field providing the user with an explanation of the problem along with a recommended course of action.

Execute solution 714 may consist of a radio button that can be activated using a pointing device such as a mouse. When activated, execute solution 714 implements the recommended course of action contained in recommendation 712.

Figure 7B:
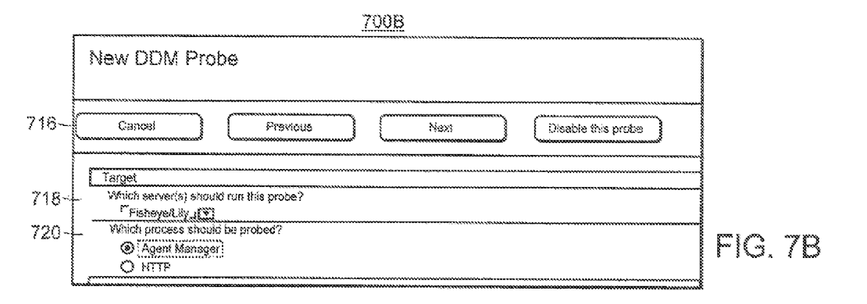

FIG. 7B contains an exemplary data display 700A containing a user interface for accepting user inputs for display of agent data. Action buttons 716 provide the user with one-click means for accessing common functionality such as canceling a requested action, going back to a previous screen or display, continuing in sequence to a subsequent display or disabling an agent probe. Target selector 718 provides the user with a means for selecting a target computer which the device that date and/or runaway agent statistics will be gathered from. Target computers may be denoted by a name, network address, association with a particular agent of interest, etc. Process selector 720 provides a user with a means for selecting a process to be probed. In FIG. 7B the user has predetermined choices of Agent Manager or HTTP, however, process selector 720 can also be configured to allow a user to enter the name of any process using a keyboard, microphone, or other input means known in the art.

Figure 7C:
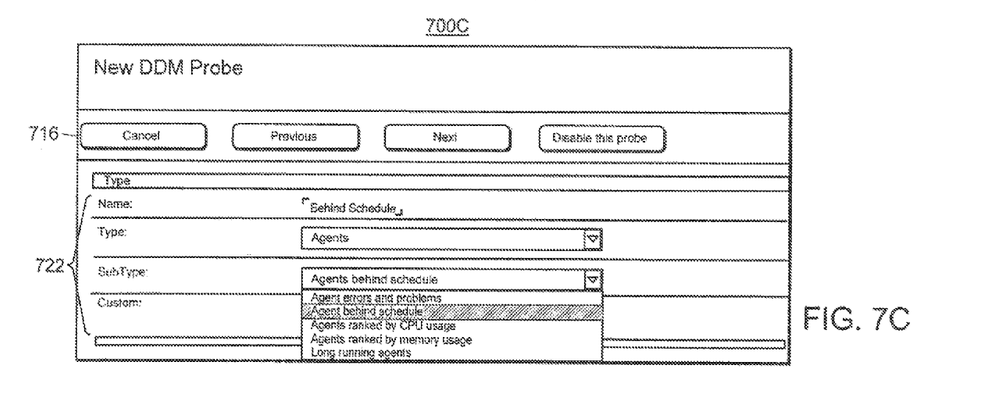

FIG. 7C contains an exemplary data display 700C containing a user interface for accepting user input data regarding agent monitoring. Data display 700C includes action buttons 716 as shown and described in connection with FIG. 7B. Type window 722 provides a user with a means for selecting the type of agent operation to be run, here "Behind Schedule" along with other parameters relevant thereto. For example, a user can choose various criteria for controlling how agent data is displayed such as by CPU usage, memory usages, or length of run time.

Figure 7D:
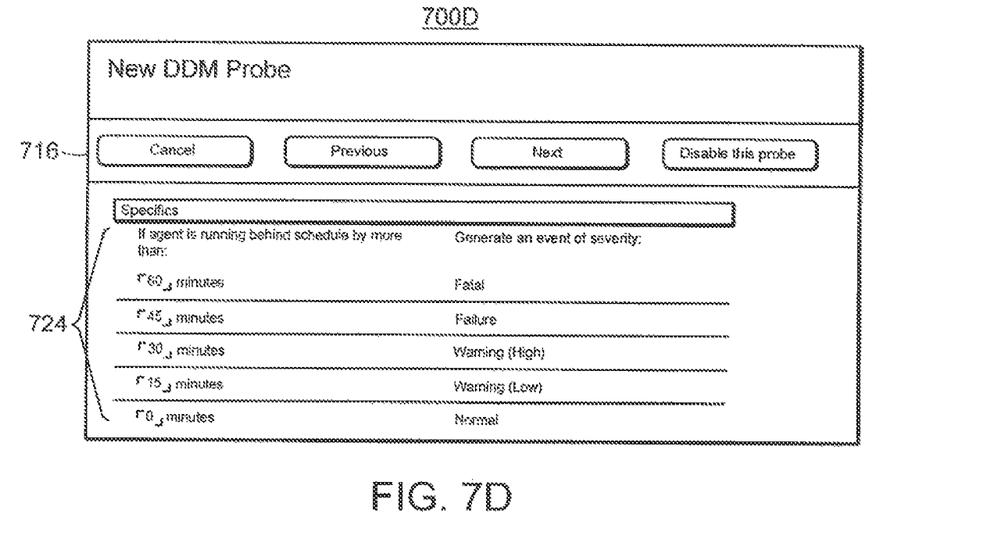

FIG. 7D contains an exemplary data display 700D containing a user interface for allowing a user to specify the severity associated with various types of agent behavior. Data display 700D includes action buttons 716 as described in connection with FIG. 7B. In addition, data display 700D includes a specifics window 724 which provides a user with a means for associating a severity level with a time interval. The time interval will typically be the amount of time that an agent is behind schedule.

Figure 7E:
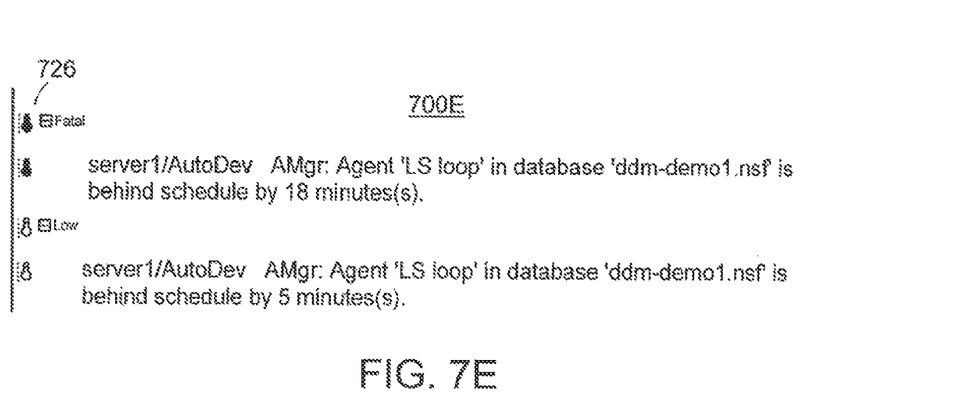

FIG. 7E contains an exemplary data display 700E containing a user interface for providing a user with the results of analysis performed on agents consistent with embodiments of the invention described hereinbefore. Data display 700E contains results icons 726 which provide a user with a color coded means of identifying the severity of problems associated with specified agents. In addition, results icons 726 can also include text or additional graphics further identifying problematic agents. For example, text may indicate the name of a problematic agent, the server it is running on, processes that rely on the agent, and the amount of time that the particular agent is behind schedule.

The displays shown in FIGS. 7A-7E are exemplary in nature and numerous changes can be made to thereto without departing from the spirit of the invention.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above description focused on monitoring scheduled and operating agents, the invention can be modified to also monitor input and output data associated with the agents. And, while a series of steps have been described with regard to FIGS. 2, 3A and 3B, and 4, the order of the steps may be varied in other implementations consistent with the present invention. Moreover, non-dependent steps may be implemented in parallel if desired.

No element, step, or instruction used in the description of the present application should be construed as critical or essential to the invention unless explicitly described as such. Also, as used herein, the article "a" is intended to include one or more items or elements. Where only one item is intended, the term "one" or similar language is used.

Many alternative embodiments of the present invention are possible in that of the teachings hereinabove. For example, in a first alternative embodiment, values displayed in agent ID 706, of display 700, may be comprised of links that when clicked on open a new window containing detailed information about the agent. The detailed information can contain parameters associated with the agent, actual source code associated with the agent, security settings and permissions associated with the agent, etc. In addition, clicking on the link may further open a source code debugger to let the user begin debugging the source code associated with a particular problematic agent.

In a second alternative embodiment, the methods illustrated in FIGS. 3A, 3B and 4 can be modified so that only agents developed by a certain programmer are identified and monitored before reporting results back to only that programmer. Implementing this embodiment of the invention may be useful to programmers or system managers in that they can assess the impact of their executable instructions on the system, thus making before and after benchmarking possible with respect to newly developed agents.

In a third alternative embodiment, the method of FIGS. 3A, 3B and 4 can be augmented by including one or more steps providing filtering of agent data, ranking of agents, and rendering ranked agent data to a display device. Agents may be filtered based on the time that they are in a queue, by the amount of time they have exceeded allocated runtimes, or by other parameters definable by a user or the system. In addition, a user or the system may associate designations, such as grading criteria or a grading scale, with agents identified as being late or runaway. For example, a user may be able to label criteria associated with agents as fatal, low warning, high warning, normal, etc.

The scope of the invention is defined by the claims and equivalents thereof hereinbelow. The claims should not be read as limited to the described order or elements unless stated to that effect. Therefore, all embodiments that come within the scope and spirit of the following claims and equivalents thereto are claimed as the invention.

What is claimed is:

1. A method for identifying a runaway software agent operating in a computer system, said method comprising:
    defining a time window for said agent;
    receiving a current time signal;
    determining a start time for said agent, said start time denoting when said agent began operating in said system;
    determining if said time window is exceeded using said start time and said current time;
    identifying said agent if said time window is exceeded, said identifying includes identifying said agent as a runaway agent;
    providing information about said agent to a user interface, without terminating said agent, wherein said user interface displays information regarding a plurality of runaway agents;
    allowing a user to specify a ranking for said agent within said plurality of runaway agents;
    wherein said ranking is responsive to a user specified severity associated with a type of agent behavior; and
    wherein said severity is associated with a corresponding time interval said agent is running behind schedule.

2. The method of claim 1, wherein said agent comprises a user developed task.

3. The method of claim 1, wherein said time window includes an operating time limit for said agent.

4. The method of claim 1, wherein said time window includes a starting event associated with said agent.

5. The method of claim 1, further comprising:
    determining if another agent relies on said agent if said agent is a runaway agent; and
    notifying said another agent relying on said runaway agent.

6. The method of claim 1, further comprising:
    wherein said information about said agent includes an explanation of why said agent has exceeded said time window and a recommended course of action; and
    wherein said user interface further includes an execute solution display object that enables a user to cause said recommended course of action to be performed.

7. The method of claim 1, further comprising:
    terminating said agent if said agent is identified.

8. A method for identifying a runaway software agent operating in an HTTP environment on a computer system coupled to a communications network, said method comprising:
    identifying a thread associated with said HTTP environment using a thread identifier;
    initiating an agent from said thread;
    defining a time window associated with said agent;
    obtaining a start time for said agent on said thread;
    receiving a current time signal;
    determining if said time window is exceeded using said start time and said current time signal;
    providing information about said runaway agent to a display device, without terminating said agent, wherein said display device displays information regarding a plurality of runaway agents; and
    ranking said agent within said plurality of other runaway agents, wherein said ranking is responsive to a user specified severity associated with a type of agent behavior, wherein said severity is associated with a corresponding time interval said agent is running behind schedule.

9. The method of claim 8, wherein said agent comprises a user developed task.

10. The method of claim 8, further comprising:
    identifying said agent as a runaway agent if said time window is exceeded.

11. The method of claim 8, further comprising:
    wherein said information about said runaway agent includes an explanation of why said runaway agent has exceeded said time window and a recommended course of action; and
    wherein said display device further displays an execute solution display object that enables a user to cause said recommended course of action to be performed.

12. The method of claim 11, further comprising:
    performing said recommended course of action on said runaway agent.

13. The method of claim 12, wherein said recommended course of action is performed, at least in part, by said user.

14. The method of claim 13, wherein said recommended course of action is performed, at least in part, by said system.

15. The method of claim 14, further comprising:
specifying a set of ranking criteria for said runaway agent using a user interface, wherein said set of ranking criteria includes said user specified severity associated with said type of agent behavior.

16. The method of claim 15, wherein said ranking further comprises fatal, failure, high warning and low warning.

17. A method for managing a plurality of software agents operating in a computer system, said method comprising the steps of:
defining a time window for said plurality of agents;
identifying at least one of said plurality of agents exceeding said time window to produce an identified set;
filtering said identified set according to predetermined filtering parameters;
ordering said agents within said identified set;
displaying said identified set, thereby managing the plurality of software agents operating in the computer system;
wherein said ordering step produces a rank ordered list of said agents in said identified set; and
wherein said filtering parameters are defined by a user.

18. The method of claim 17, wherein said software agents comprise user developed tasks.

19. The method of claim 17, further comprising:
identifying members of said identified set having a thread associated therewith to produce a thread set.

20. A computer program product including a computer readable medium, said computer readable medium having machine-readable instructions stored thereon for instructing a processor to perform a method for identifying a software agent operating in a computer system, said machine-readable instructions comprising:
instructions for defining a time window associated with said agent;
instructions for receiving a current time signal;
instructions for determining a start time for said agent;
determining if said time window has been exceeded using said start time and said current time;
instructions for flagging said agent as a runaway agent if said time window is exceeded;
instructions for providing information about said agent to a user interface, without terminating said agent, wherein said user interface displays information regarding a plurality of runaway agents;
instructions for allowing a user to specify a ranking for said agent within said plurality of runaway agents;
wherein said ranking is responsive to a user specified severity associated with a type of agent behavior; and
wherein said severity is associated with a corresponding time interval said agent is running behind schedule.

21. The computer program product of claim 20, wherein said runaway agent comprises a user developed task.

22. The computer program product of claim 20, wherein said time window includes an operating time limit for said agent.

23. The computer program product of claim 20, said machine-readable instructions further comprising:
wherein said information about said agent includes an explanation of why said agent has exceeded said time window and a recommended course of action; and
wherein said user interface further includes an execute solution display object that enables a user to cause said recommended course of action to be performed.

* * * * *